United States Patent [19]

Day, Sr.

[11] Patent Number: 5,526,602
[45] Date of Patent: Jun. 18, 1996

[54] FISHING LURE AND HOOK APPARATUS

[76] Inventor: Jerry O. Day, Sr., 993 W. 4th North, Moab, Utah 84532

[21] Appl. No.: 305,417

[22] Filed: Sep. 13, 1994

Related U.S. Application Data

[63] Continuation of Ser. No. 127,182, Sep. 27, 1993, abandoned.

[51] Int. Cl.⁶ .................................................. A01K 83/02
[52] U.S. Cl. ...................................... 43/37; 43/35
[58] Field of Search .................................. 43/34, 35, 36, 43/37, 42.06, 42.15

[56] References Cited

U.S. PATENT DOCUMENTS

| | | | |
|---|---|---|---|
| 2,439,391 | 4/1948 | Jobson | 43/37 |
| 2,702,961 | 1/1955 | Godbey | 43/35 |
| 2,896,355 | 7/1959 | Dean | 43/35 |
| 3,105,317 | 10/1963 | Fox | 43/42.06 |
| 3,266,185 | 8/1966 | Abramson | 43/35 |
| 3,757,450 | 9/1973 | Martinez | 43/35 |
| 3,786,587 | 1/1974 | Niileksela | 43/35 |
| 4,035,945 | 7/1977 | Newman | 43/42.15 |
| 4,656,775 | 4/1987 | Annett II | 43/35 |

*Primary Examiner*—Kurt Rowan

[57] ABSTRACT

A new and improved fishing lure and hook apparatus includes a housing assembly which has a longitudinal axis and includes a housing assembly which includes a guide aperture located at one end of the housing assembly along the longitudinal axis. The housing assembly includes first and second slots located in the housing assembly along lines that are coplanar with the longitudinal axis. A retractable hook assembly is supported by the housing assembly. The retractable hook assembly includes a first extendible hook and a second extendible hook. Respective pivots pivotally support the respective first and second extendible hooks. Respective first and second hook springs are connected between the housing assembly and the respective first and second extendible hooks. The respective hook springs urge the respective extendible hooks into retracted positions. A hook extender assembly, supported by the housing assembly and actuated by a force exerted on the hook extender assembly along the longitudinal axis by a fishing line, is used for extending the respective extendible hooks through the respective slots in the housing assembly. A trailer assembly may be provided, and an articulated connection assembly is used for connecting the trailer assembly to the housing assembly. A chemical dispenser assembly may be provided for dispensing a quantity of a chemical into water as the fishing lure and hook apparatus is in the water. The chemical dispenser assembly may be located in a trailer assembly which is connected to the housing assembly with an articulated connection assembly.

6 Claims, 4 Drawing Sheets

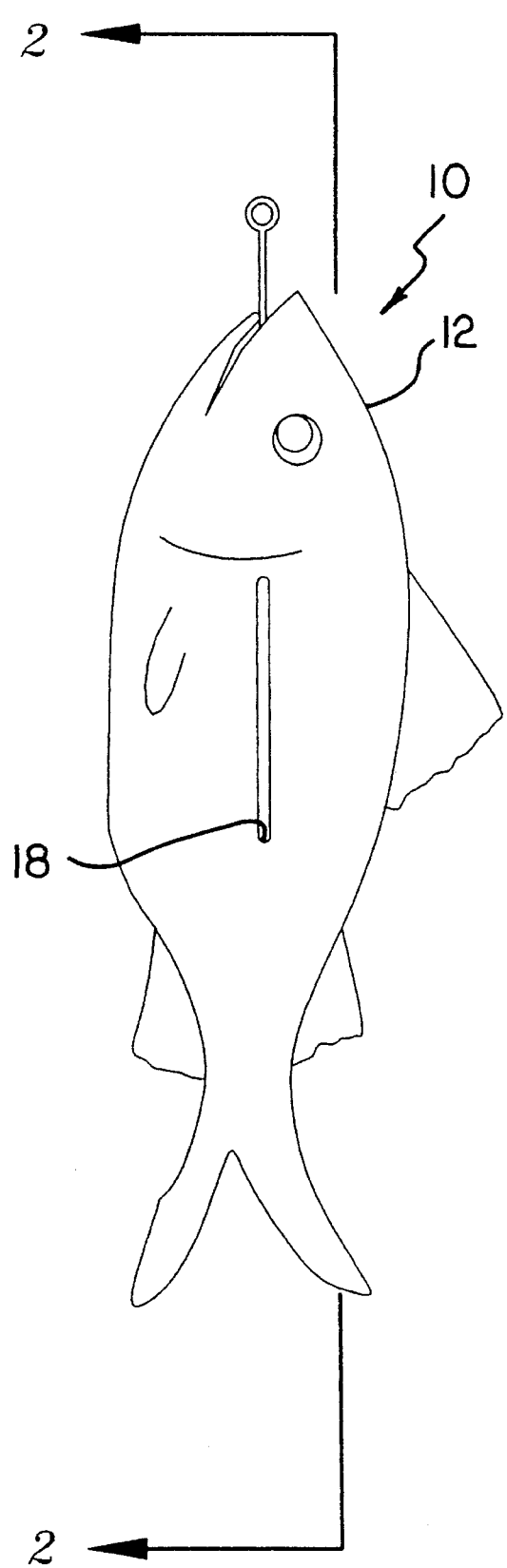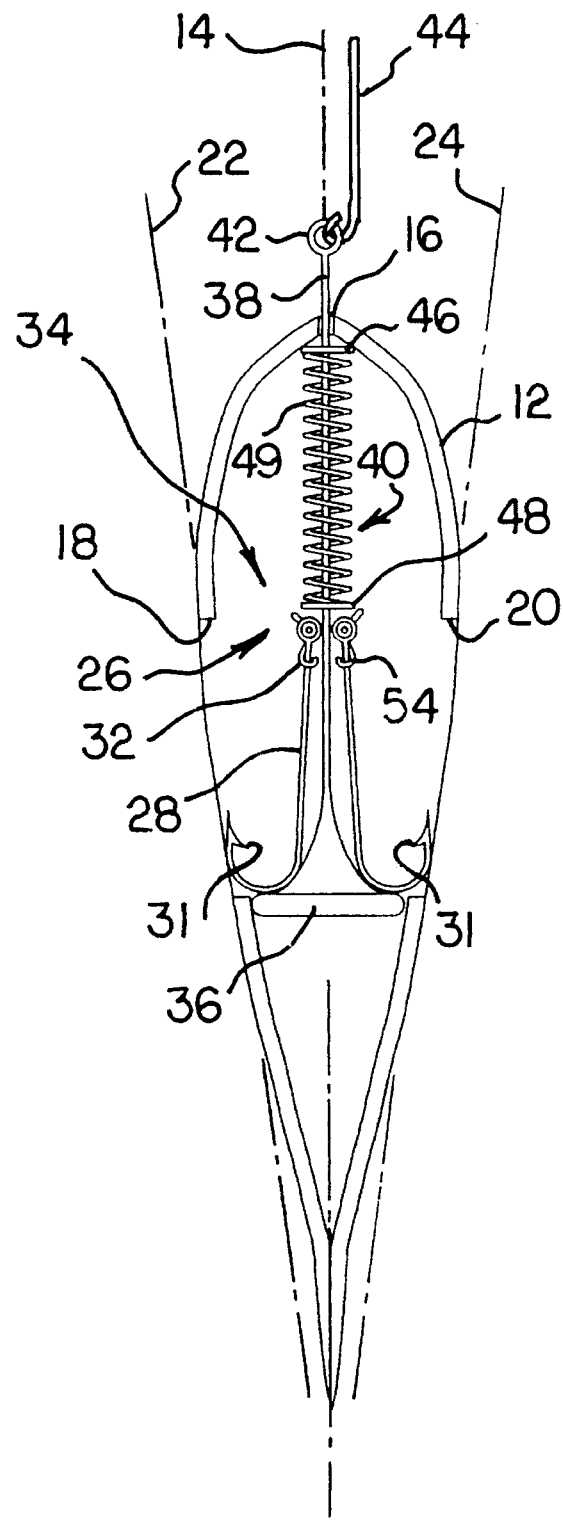
FIG. 1
FIG. 2

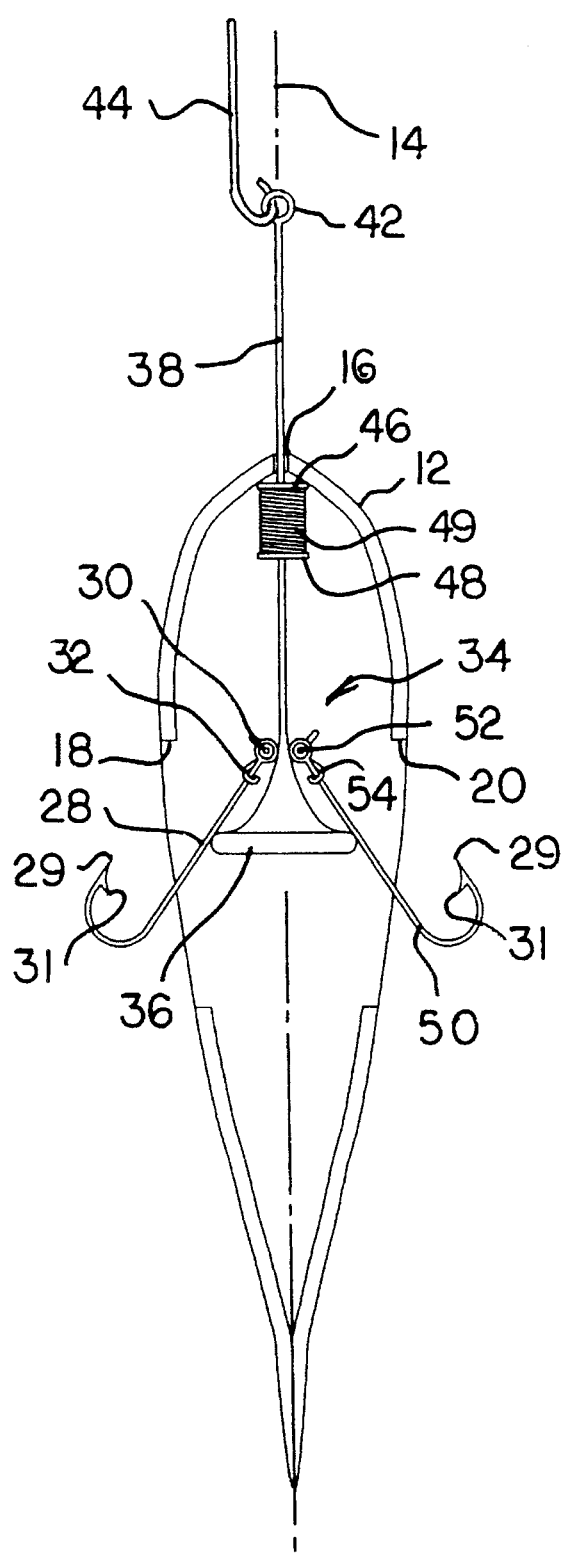
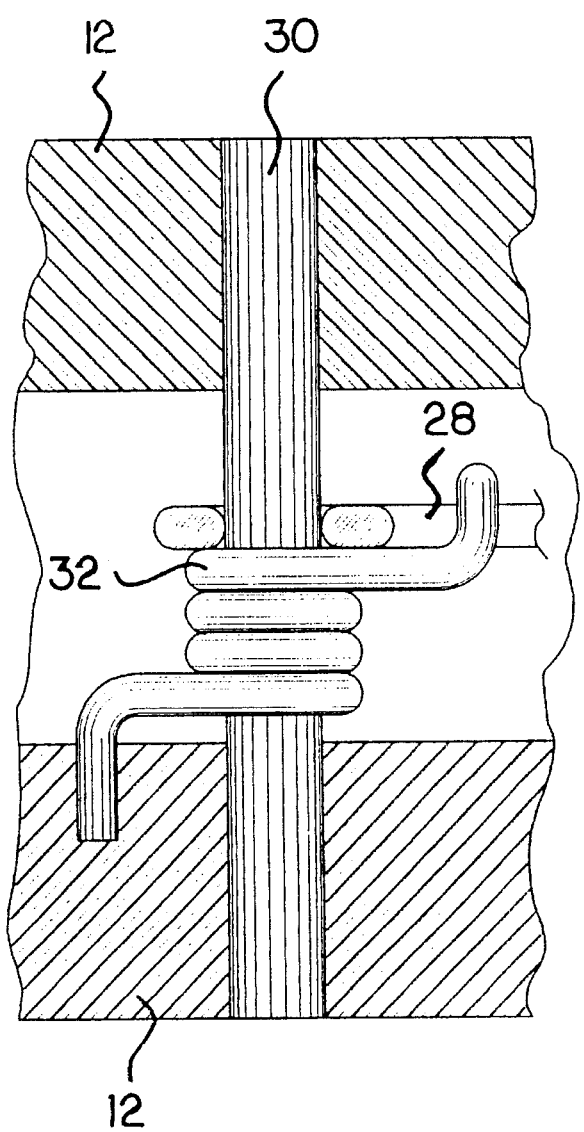
FIG. 3
FIG. 4

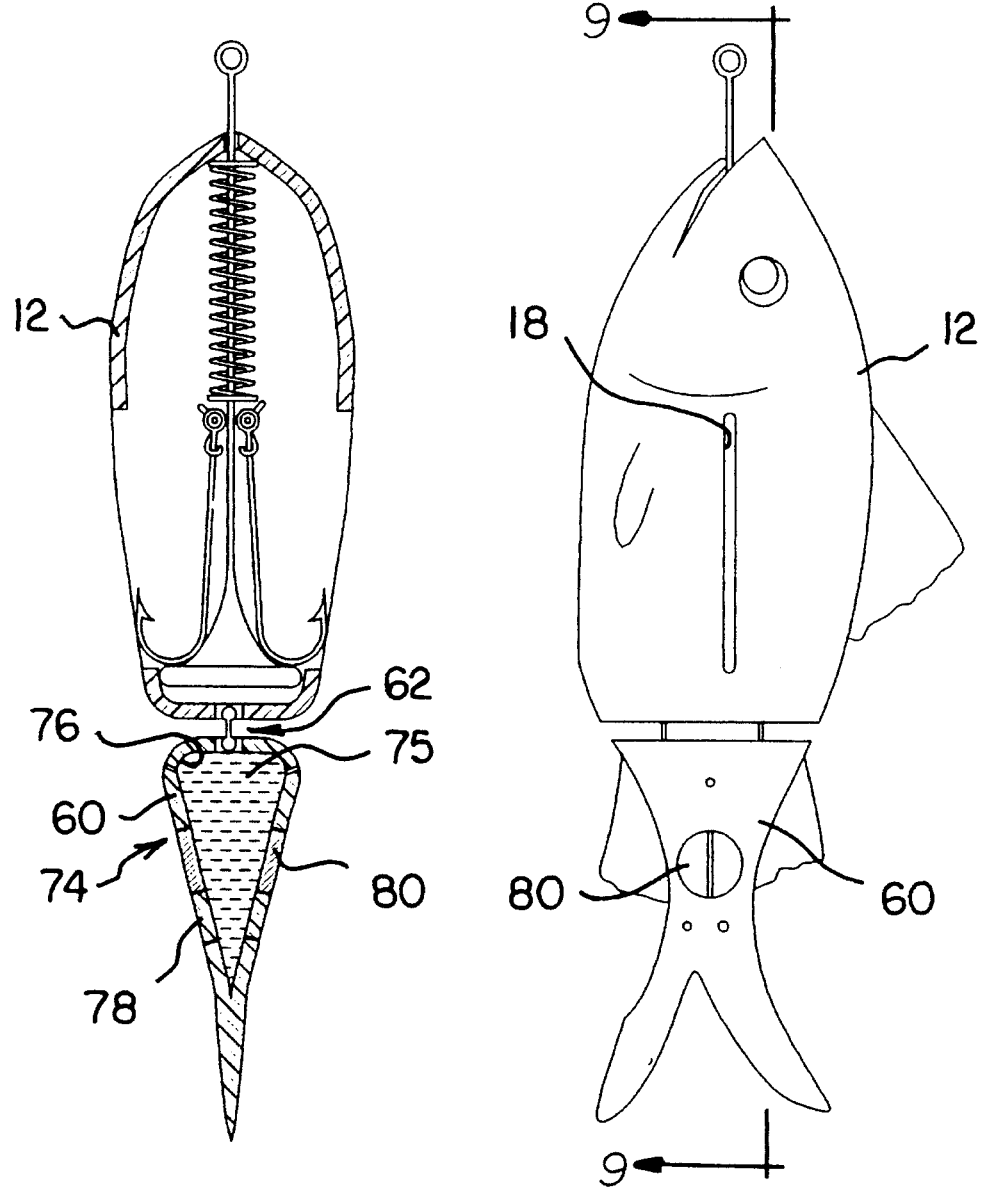
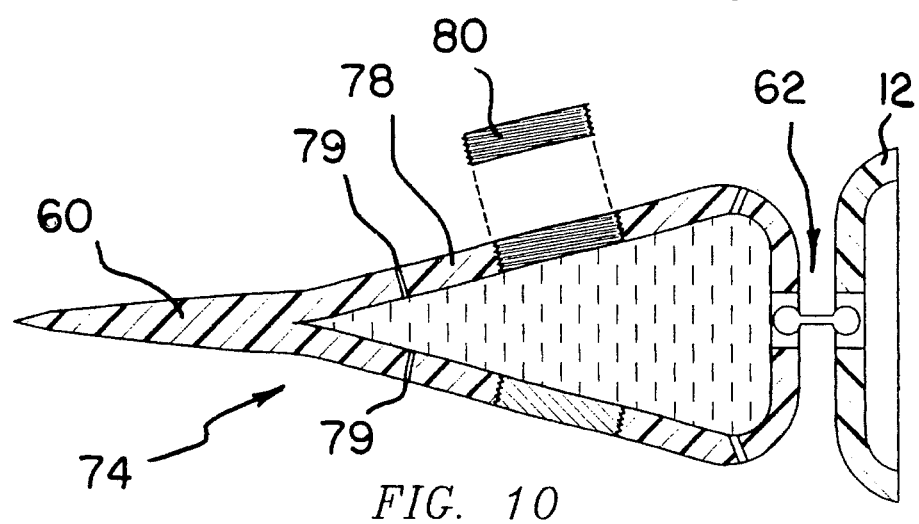
FIG. 9   FIG. 8   FIG. 10

FISHING LURE AND HOOK APPARATUS

This application is a continuation of application Ser. No. 08/127,182, filed Sep. 27, 1993, now abandoned.

BACKGROUND OF THE INVENTION

1. Field of the Invention

The present invention relates generally to fishing lures and hooks, and, more particularly, to fishing lures and hooks especially adapted for fishing in areas which include underwater weeds.

2. Description of the Prior Art

Fishing is a popular sport, and its popularity is constantly increasing. Many people enjoy the recreational benefits of fishing whether or not any fish are caught. However, for a many people, when fish are caught, the activity of fishing is more greatly appreciated and enjoyed.

In certain environments, successful fishing is impeded by underwater plant growth. More specifically, barbed fish hooks are often caught in underwater grass and underwater branches and roots of trees.

Throughout the years, a number of innovations have been developed relating to fishing lures and hooks especially adapted for fishing in areas which have underwater plant growth, and the following U.S. Pat. Nos. are representative of some of those innovations: 3,605,318; 3,986,290; 4,793,090; 5,010,679; and 5,107,615. More specifically, U.S. Pat. Nos. 3,605,318 and 3,986,290 disclose bare fish hooks that are not associated with lures. In this respect, it would be desirable if a fishing lure and hook device were provided with features that both presented a fishing lure to an underwater fish and prevented the fishing hook from snagging in underwater weeds and the like.

U.S. Pat. No. 4,793,090 discloses attachments to cover fishing hooks that are associated with a fishing lure. There is a one-to-one correspondence between each hook and each hook protector. For the six fishing hooks in the embodiment disclosed in the patent, there are six fishing hook protectors. Each individual fishing hook protector must be separately fixed onto its respective hook. This is a tedious and time-consuming job. In this respect, it would be desirable if a fishing lure and hook device were provided which provided one protector for all of the fishing hooks that are protected.

U.S. Pat. No. 5,010,679 discloses a fishing lure and hook device which has a lure body and a hook hidden within the body of the lure. When the fish strikes the lure, the fisherman exerts tension on the line, and the tension exerted on the line causes the hidden hook to emerge from the lure and penetrate the fish. With the device in this patent, a single hook emerges from one side of the lure body. A problem associated with this type of device is that the fish may approach the lure in such a way that the single hook does not adequately penetrate the fish when the fisherman exerts tension on the fishing line. In this respect, it would be deskable if a fishing lure and hook device were provided which included more than one hook to provide for a fish approaching the lure with different orientations. In one method of operation for this device, an elastic band is placed outside the lure, and tension exerted on the fishing line causes tension in the elastic band to be overcome. In the environment of water, elastic band have a tendency to deteriorate. In this respect, it would be desirable if a fishing lure and hook device were provided which did not depend upon an elastic band for keeping a hook hidden.

U.S. Pat. No. 5,107,615 discloses a weedless fishing lure which includes resilient fish hooks that are resiliently deflected inside a fishing lure body by the wall of the lure. When a fish distorts the wall of the lure, the resilient fish hook springs out from within the lure body. One disadvantage of this device is the danger of accidentally triggering of the resilient fish hook if the fishing lure is handled roughly. In this respect, it would be desirable if a fishing lure and hook device were provided that will not cause a hook to emerge from a lure if the lure is handled roughly. Another disadvantage of this device the requirement that the fish hooks be made from resilient material. Fish hooks are usually made from rigid material so that a hooked fish will be securely held on the hook. In this respect, it would be desirable if a fishing lure and hook device were provided that did not require a fish hook to be made of resilient material. Still another disadvantage of this device is the dependency of the activity of the fish for triggering release of the hook. It is preferable that release of the hook be under the control of the fisherman not the fish.

Still other features would be desirable in a fishing lure and hook device. A lure is successful that mimics or simulates motions of the normal food of the fish. Many fish prey upon other fish. In this respect it would be desirable if the lure exhibited a wiggling fish-like motion.

A lure generally attracts fish using the visual senses of the fish. Fish, however, have other senses besides the sense of sight. An important sense in some fish is the sense of smell. Another important sense is the sense of taste. In this respect, it would be desirable if a fishing lure and hook device were provided that appeals to the sense of smell or the sense of taste of the fish.

Thus, while the foregoing body of prior art indicates it to be well known to use fishing lure and hook devices, the prior art described above does not teach or suggest a fishing lure and hook apparatus which has the following combination of desirable features: (1) presents a fishing lure to an underwater fish and prevents the fishing hook from snagging in underwater weeds and the like; (2) provides one protector for all of the fishing hooks that are protected; (3) does not depend upon an elastic band for keeping a hook hidden; (4) includes more than one hook to provide for a fish approaching the lure from different orientations; (5) will not cause a hook to emerge from a lure if the lure is handled roughly; (6) does not require a fish hook to be made of resilient material; (7) provides that the release of the hook is under the control of the fisherman not the fish; (8) exhibits a wiggling fish-like motion when in the water; and (9) appeals to the sense of smell or the sense of taste of the fish. The foregoing desired characteristics are provided by the unique fishing lure and hook apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved fishing lure and hook apparatus which includes a housing assembly which has a longitudinal axis and includes a housing assembly which includes a guide aperture located at one end of the housing assembly along the longitudinal axis. The housing assembly includes a first slot located in the housing assembly along a line that is coplanar with the longitudinal axis. A retractable hook assembly is supported by the housing assembly. The retractable hook assembly includes a first extendible hook. A first pivot pivotally supports the first extendible hook and is supported by the housing assembly. A first hook spring is connected between the housing assembly and the first extendible hook. The first hook spring urges the first extendable hook into a retracted position. A hook extender assembly, supported by the housing assembly and actuated by a force exerted on the hook extender assembly along the longitudinal axis by a fishing line, is used for extending the first extendible hook through the first slot in the housing assembly.

The housing assembly may further include a second slot located in the housing assembly along line that is coplanar with the longitudinal axis. The retractable hook assembly further includes a second extendible hook. A second pivot pivotally supports the second extendible hook and is supported by the housing assembly. A second hook spring is connected between the housing assembly and the second extendible hook. The second hook spring urges the second extendible hook into a retracted position. The hook extender assembly, supported by the housing assembly and actuated by a force exerted on the hook extender assembly along the longitudinal axis, extends the second extendible hook through the second slot in the housing assembly.

The hook extender assembly may include a cam portion placed in sliding contact with the first extendible hook. A shaft is connected to the cam portion. A hook retraction spring assembly is connected to the shaft, and an eyelet is attached to the shaft. The eyelet is capable of being attached to a fishing line for exerting a force along the shaft along the longitudinal axis on the cam portion in opposition to the hook retraction spring assembly for extending the first extendible hook through the first slot and for extending the second extendible hook through the second slot in the housing assembly.

The hook retraction spring assembly may include a first compression member installed on the shaft adjacent to the guide aperture of the housing assembly. A second compression member is installed on the shaft adjacent to the first extendible hook, and a spring member installed on the shaft between the first compression member and the second compression member.

A trailer assembly may be provided, and an articulated connection assembly is used for connecting the trailer assembly to the housing assembly. The housing assembly includes a first socket. The trailer assembly includes a second socket. The articulated connection assembly includes a rod which includes a first ball for connection with the first socket and which includes a second ball for connection with the second socket.

A chemical dispenser assembly may be provided for dispensing a quantity of a chemical into water as the fishing lure and hook apparatus is in the water. The chemical dispenser assembly includes a chemical storage chamber for storing a quantity of a chemical. A wall is provided for the chemical storage chamber, and the wall includes pores which permit a quantity of the chemical contained in the chemical storage chamber to pass from the chemical storage chamber to outside the chemical dispenser assembly. The wall includes a screw cap which can be removed for adding more of the chemical to the chemical storage chamber. Preferably, the chemical is a fish scent.

The chemical dispenser assembly may be located in a trailer assembly which is connected to the housing assembly with an articulated connection assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved fishing lure and hook apparatus which has all of the advantages of the prior art and none of the disadvantages.

It is another object of the present invention to provide a new and improved fishing lure and hook apparatus which may be easily and efficiently manufactured and marketed.

It is a further object of the present invention to provide a new and improved fishing lure and hook apparatus which is of durable and reliable construction.

An even further object of the present invention is to provide a new and improved fishing lure and hook apparatus which is susceptible of a low cost of manufacture with regard to both materials and labor, and which accordingly is then susceptible of low prices of sale to the consuming public, thereby making such fishing lure and hook apparatus available to the buying public.

Still yet a further object of the present invention is to provide a new and improved fishing lure and hook apparatus which presents a fishing lure to an underwater fish and prevents the fishing hook from snagging in underwater weeds and the like.

Still another object of the present invention is to provide a new and improved fishing lure and hook apparatus that provides one protector for all of the fishing hooks that are protected.

Yet another object of the present invention is to provide a new and improved fishing lure and hook apparatus which does not depend upon an elastic band for keeping a hook hidden.

Even another object of the present invention is to provide a new and improved fishing lure and hook apparatus that includes more than one hook to provide for a fish approaching the lure from different orientations.

Still a further object of the present invention is to provide a new and improved fishing lure and hook apparatus which will not cause a hook to emerge from a lure if the lure is handled roughly.

Yet another object of the present invention is to provide a new and improved fishing lure and hook apparatus that does not require a fish hook to be made of resilient material.

Still another object of the present invention is to provide a new and improved fishing lure and hook apparatus which provides that the release of the hook is under the control of the fisherman not the fish.

Yet another object of the present invention is to provide a new and improved fishing lure and hook apparatus that exhibits a wiggling fish-like motion when in the water.

Still a further object of the present invention is to provide a new and improved fishing lure and hook apparatus that appeals to the sense of smell or the sense of taste of the fish.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a first preferred embodiment of the fishing lure and hook apparatus of the invention.

FIG. 2 is a cross-sectional view of the fishing lure and hook apparatus along line 2—2 of FIG. 1, wherein the apparatus is in the smooth or non-hooking orientation.

FIG. 3 is a cross-sectional view of the fishing lure and hook apparatus of FIG. 2 wherein the apparatus is in a hooking orientation.

FIG. 4 is an enlarged view of the mechanism used in the embodiment of the invention shown in FIGS. 2 and 3 for urging the fish hooks into a non-hooking orientation.

FIG. 8 is a side view showing a third embodiment of the fishing lure and hook apparatus of the invention showing a scent dispenser as part of the lure.

FIG. 9 is a cross-sectional view of the embodiment of the invention shown in FIG. 8 taken along line 9—9 thereof.

FIG. 10 is an enlarged view of the scent dispenser in the embodiment of the invention shown in FIG. 9.

DESCRIPTION OF THE PREFERRED EMBODIMENT

Figures 5, 6:
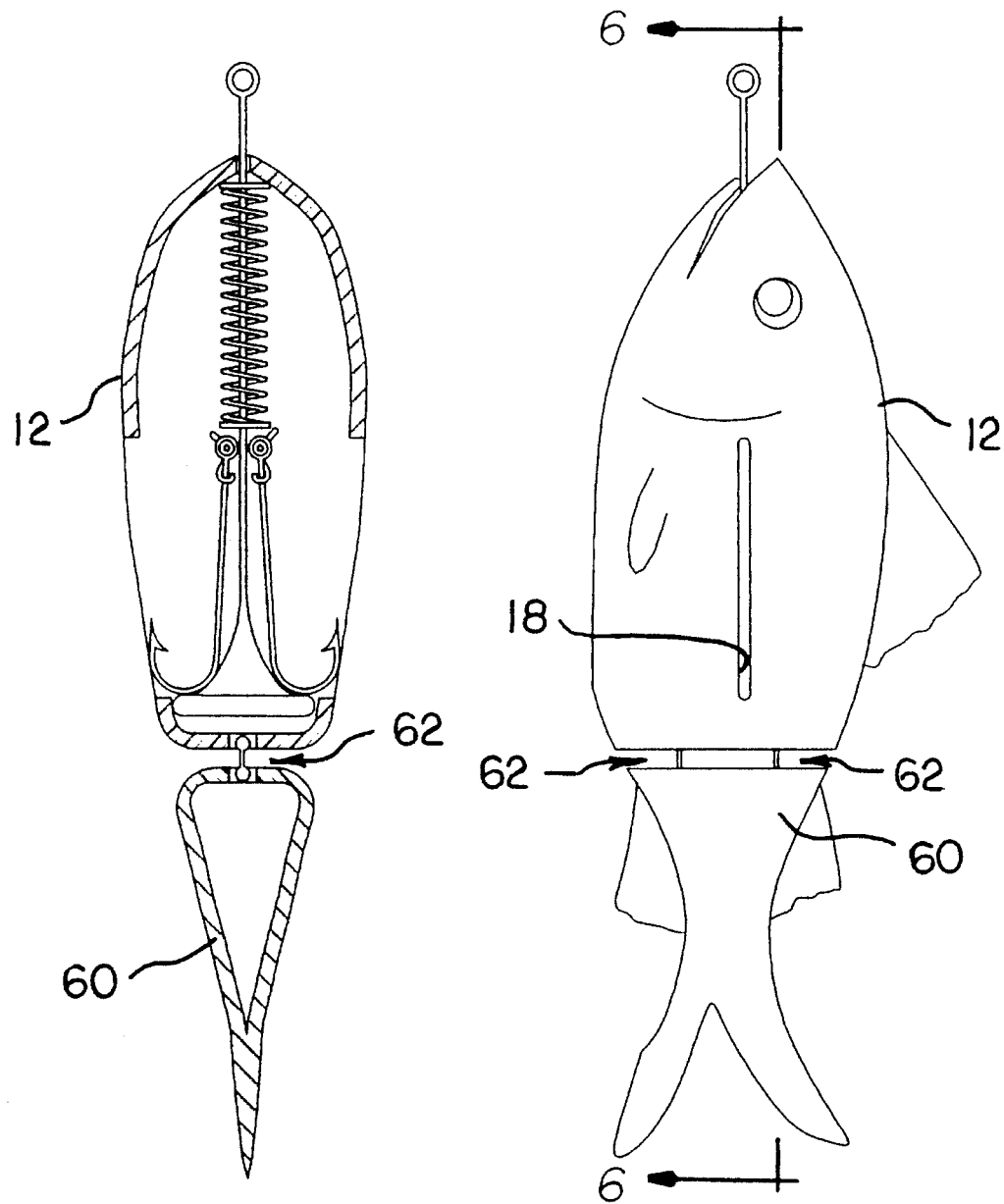
FIG. 5 is a side view showing a second embodiment of the fishing lure and hook apparatus of the invention showing an articulated joint between two body portions of the lure.
FIG. 6 is a cross-sectional view of the embodiment of the invention shown in FIG. 5 taken along line 6—6 thereof.

With reference to the drawings, a new and improved fishing lure and hook apparatus embodying the principles and concepts of the present invention will be described.

Turning initially to FIGS. 1–4, there is shown a first exemplary embodiment of the fishing lure and hook apparatus of the invention generally designated by reference numeral 10. In its preferred form, fishing lure and hook apparatus 10 includes a housing assembly 12 which has a longitudinal axis 14 and includes a housing assembly 12 which includes a guide aperture 16 located at one end of the housing assembly 12 along the longitudinal axis 14. The housing assembly 12 includes a first slot 18 located in the housing assembly 12 along a line 22 that is coplanar with the longitudinal axis 14. A retractable hook assembly 26 is supported by the housing assembly 12. The retractable hook assembly 26 includes a first extendable hook 28. A first pivot 30 pivotally supports the first extendible hook 28 and is supported by the housing assembly 12. A first hook spring 32 is connected between the housing assembly 12 and the first extendible hook 28. The first hook spring 32 urges the first extendible hook 28 into a retracted position. A hook extender assembly 34, supported by the housing assembly 12 and actuated by a force exerted on the hook extender assembly 34 along the longitudinal axis 14 by a fishing line 44, is used for extending the first extendible hook 28 through the first slot 18 in the housing assembly 12.

The housing assembly 12 further includes a second slot 20 located in the housing assembly 12 along line 24 that is coplanar with the longitudinal axis 14. The retractable hook assembly 26 further includes a second extendible hook 50. A second pivot 52 pivotally supports the second extendible hook 50 and is supported by the housing assembly 12. A second hook spring 54 is connected between the housing assembly 12 and the second extendible hook 50. The second hook spring 54 urges the second extendible hook 50 into a retracted position. The hook extender assembly 34, supported by the housing assembly 12 and actuated by a force exerted on the hook extender assembly 34 along the longitudinal axis 14, extends the second extendible hook 50 through the second slot 20 in the housing assembly 12.

More specifically, the retractable hook assembly is supported by the housing assembly 12 and is mounted on the housing assembly 12. The retractable hook assembly extends on a first side and a second side of the longitudinal axis 14. The retractable hook assembly includes a first extendible hook 28 located in a plane coplanar with the longitudinal axis 14 on the first side of longitudinal axis 14. A first pivot 30 pivotally supports the first extendible hook and is supported by the housing assembly 12. A first hook spring 32 is connected between the housing assembly 12 and the first extendible hook 28. The first hook spring 32 is for urging the first extendible hook 28 into a retracted position. The retractable hook assembly further includes a second extendible hook 28 mounted on the housing assembly 12 along the second side of the longitudinal axis 14 in a position opposite to the first extendible hook 28 and located in a plane coplanar with the longitudinal axis 14 and the first extendible hook 28. A second pivot 52 pivotally supports the second extendible hook 28 and is supported by the housing assembly 12. A second hook spring 54 is connected between the housing assembly 12 and the second extendible hook 28. The second hook spring 54 is for urging the second extendible hook 28 into a retracted position.

The hook extender assembly 34 includes a cam portion 36 placed in sliding contact with the first extendible hook 28. A shaft 38 is connected to the cam portion 36. A hook retraction spring assembly 40 is connected to the shaft 38, and an eyelet 42 is attached to the shaft 38. The eyelet 42 is capable of being attached to a fishing line 44 for exerting a force along the shaft 38 along the longitudinal axis 14 on the cam portion 36 in opposition to the hook retraction spring assembly 40 for extending the first extendible hook 28 through the first slot 18 and for extending the second extendible hook 50 through the second slot 20 in the housing assembly 12.

The hook retraction spring assembly 40 includes a first compression member 46 installed on the shaft 38 adjacent to the guide aperture 16 of the housing assembly 12. A second compression member 48 is installed on the shaft 38 adjacent to the first extendible hook 28, and a spring member 49 installed on the shaft 38 between the first compression member 46 and the second compression member 48.

In operation, the fishing lure and hook apparatus 10 of the invention is tied to a fishing line 44 at eyelet 42 and is lowered into the water in the retracted state shown in FIG. 2. When a fish (not shown) bites the apparatus 10, the fishing line 44 is yanked by the operator, and the cam portion 36 is pulled up against the back portions of the first extendible hook 28 and the second extendible hook 50. When this happens, the hooks pivot around the respective first pivot 30 and second pivot 52 causing the hooks to move into the extended position shown in FIG. 3. As the hooks are extended, the tips 29 of the hooks are driven into the mouth of the fish.

When the hooks are extended, the second compression member 48 pushes up on the spring member 49 which is sandwiched between the second compression member 48 and the first compression member 46. Once the fish is hooked, the longitudinal tension on the fishing line 44 may be lessened, and, as a result, the spring member 49 returns to the uncompressed position shown in FIG. 2. The second compression member 48 and the cam portion 36 also return to the respective positions shown in FIG. 2. However, the first extendible hook 28 and the second extendible hook 50 remain in the extended positions, shown in FIG. 3, in the hooked fish.

In addition, the first hook spring 32 and the second hook spring 54 urge the respective first extendible hook 28 and second extendible hook 50 toward the retracted position. In so doing, the first hook spring 32 and the second hook spring 54 drive the respective barbs 31 into the fish's mouth, thereby increasing the hold of the hooks on the fish.

Figure 7:
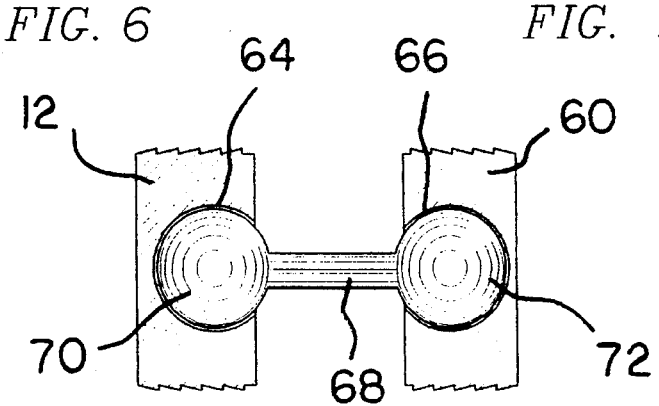
FIG. 7 is an enlarged view of the articulated joint in the embodiment of the invention shown in FIG. 6.

Turning to FIGS. 5–7, a second embodiment of the invention is shown. Reference numerals are shown that correspond to like reference numerals that designate like elements shown in the other figures. In addition, a trailer assembly 60 is provided, and an articulated connection assembly 62 is used for connecting the trailer assembly 60 to the housing assembly 12. The housing assembly 12 includes a first socket 64. The trailer assembly 60 includes a second socket 66. The articulated connection assembly 62 includes a rod 68 which includes a first ball 70 for connection with the first socket 64 and which includes a second ball 72 for connection with the second socket 66.

The articulated connection assembly 62 permits the trailer assembly 60 to wiggle with respect to the housing assembly 12. Preferably, the housing assembly 12 resembles the body of fish, and the trailer assembly 60 resembles a fish tail, the overall appearance of the fishing lure and hook apparatus 10 of the invention to a fish in the water is a wiggling fish.

Turning to FIGS. 8–10, a third embodiment of the invention is shown. Reference numerals are shown that correspond to like reference numerals that designate like elements shown in the other figures. In addition, a chemical dispenser assembly 74 is provided for dispensing a quantity of a chemical 75 into water as the fishing lure and hook apparatus 10 is in the water. The chemical dispenser assembly 74 includes a chemical storage chamber 76 for storing a quantity of a chemical 75. A wall 78 is provided for the chemical storage chamber 76, and the wall 78 includes pores 79 which permit a quantity of the chemical contained in the chemical storage chamber 76 to pass from the chemical storage chamber 76 to outside the chemical dispenser assembly 74. The wall 78 includes a screw cap 80 which can be removed for adding more of the chemical to the chemical storage chamber 76. Preferably, the chemical 75 is a fish scent.

The chemical dispenser assembly 74 is located in a trailer assembly 60 is connected to the housing assembly 12 with an articulated connection assembly 62. As the trailer assembly 60 wiggles, the dispensing of the fish scent follows the wiggling pattern. This wiggling pattern of fish scent dispensing is highly simulative of a real fish swimming in the water and increases the potential for the fishing lure and hook apparatus 10 of the invention to attract fish.

The components of the fishing lure and hook apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing lure and hook apparatus that is low in cost, relatively simple in design and operation, and which may advantageously be used to present a fishing lure to an underwater fish and to prevent the fishing hook from snagging in underwater weeds and the like. With the invention, a fishing lure and hook apparatus is provided which provides one protector for all of the fishing hooks that are protected. With the invention, a fishing lure and hook apparatus is provided which does not depend upon an elastic band for keeping a hook hidden. With the invention, a fishing lure and hook apparatus is provided which includes more than one hook to provide for a fish approaching the lure from different orientations. With the invention, a fishing lure and hook apparatus is provided which will not cause a hook to emerge from a lure if the lure is handled roughly. With the invention, a fishing lure and hook apparatus is provided which does not require a fish hook to be made of resilient material. With the invention, a fishing lure and hook apparatus is provided which provides that the release of the hook is under the control of the fisherman not the fish. With the invention, a fishing lure and hook apparatus is provided which exhibits a wiggling fish-like motion when in the water. With the invention, a fishing lure and hook apparatus is provided which appeals to the sense of smell or the sense of taste of the fish.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved fishing lure and hook apparatus, comprising:

a housing assembly having a longitudinal axis, said housing assembly including a guide aperture located at one end of said housing assembly along said longitudinal axis, said housing assembly including a first slot located in said housing assembly along a line that is coplanar with said longitudinal axis, said housing assembly also including a second slot located in said housing assembly along a line that is coplanar with said longitudinal axis and said first slot, wherein said second slot is located directly opposite said first slot on said housing assembly, a retractable hook assembly supported by said housing assembly and mounted on said housing assembly, said retractable hook assembly extending on a first side and a second side of said longitudinal axis, said retractable hook assembly including a first extendible hook located in a plane coplanar with said longitudinal axis on the first side of said longitudinal axis, a first pivot defining a first pivot axis pivotally supporting said first extendible hook and supported by said housing assembly, said first pivot axis extending perpendicular to said longitudinal axis, a first hook spring connected between said housing assembly and said first extendible hook, said first hook spring extending parallel to said first pivot axis, said first hook spring for urging said first extendible hook into a retracted position, said retractable hook assembly further including a second extendible hook mounted on said housing assembly along said second side of said longitudinal axis in a position opposite to said first extendible hook and located in a plane coplanar with said longitudinal axis and said first extendible hook, a second pivot defining a second pivot axis pivotally supporting said second extendible hook and supported by said housing assembly, said second pivot axis extending perpendicular to said longitudinal axis, a second hook spring connected between said housing assembly and said second extendible hook, said second hook spring extending parallel to said second pivot axis, said second hook spring for urging said second extendible hook into a retracted position, and a hook extender assembly, supported by said housing assembly and actuated by a force exerted on said hook extender assembly along said longitudinal axis by a fishing line, for extending said first extendible hook through said first slot in said housing assembly and for extending said second extendible hook through said second slot in said housing assembly, wherein said first extendible hook and said second extendible hook are extended in opposite directions in said plane in which said first extendible hook, said second extendible hook, and said longitudinal axis are located, wherein said hook extender assembly includes a cam portion placed in sliding contact with said first extendible hook and said second extendible hook, a shaft connected to said cam portion, said first hook retraction spring being connected to said first extendible hook and to said shaft, and said second hook retraction spring being connected to said second extendible hook and to said shaft, and an eyelet attached to said shaft, said eyelet adapted for being attached to a fishing line for exerting a force along said shaft along said longitudinal axis on said cam portion in opposition to said first hook retraction spring assembly and to said second hook retraction spring assembly for extending said first extendible hook through said first slot in said housing assembly and for extending said second extendible hook through said second slot in said housing assembly.

2. The apparatus described in claim 1 wherein said hook retraction spring assembly includes:

a first compression member installed on said shaft adjacent to said guide aperture of said housing assembly, a second compression member installed on said shaft adjacent to said first extendible hook, and a spring member installed on said shaft between said first compression member and said second compression member.

3. The apparatus described in claim 1, further including:

a chemical dispenser assembly for dispensing a quantity of a chemical into water as said fishing lure and hook apparatus is in the water.

4. The apparatus described in claim 3 wherein said chemical dispenser assembly includes:

a chemical storage chamber for storing a quantity of a chemical, a wall which includes pores which permit a quantity of the chemical contained in said chemical storage chamber to pass from said chemical storage chamber to outside said chemical dispenser assembly.

5. The apparatus described in claim 4 wherein said wall includes a screw cap which can be removed for adding more of the chemical to said chemical storage chamber.

6. The apparatus described in claim 3 wherein the chemical is a fish scent.

* * * * *